United States Patent
Hu et al.

(10) Patent No.: US 10,929,136 B2
(45) Date of Patent: Feb. 23, 2021

(54) ACCURATE EARLY BRANCH PREDICTION USING MULTIPLE PREDICTORS HAVING DIFFERENT ACCURACY AND LATENCY IN HIGH-PERFORMANCE MICROPROCESSORS

(71) Applicant: Futurewei Technologies, Inc., Plano, TX (US)

(72) Inventors: Shiwen Hu, Sunnyvale, CA (US); Wei Yu Chen, Fremont, CA (US); Michael Chow, Saratoga, CA (US); Qian Wang, Santa Clara, CA (US); Yongbin Zhou, Beijing (CN); Lixia Yang, Beijing (CN); Ning Yang, Beijing (CN)

(73) Assignee: Futurewei Technologies, Inc., Plano, TX (US)

( * ) Notice: Subject to any disclaimer, the term of this patent is extended or adjusted under 35 U.S.C. 154(b) by 64 days.

(21) Appl. No.: 15/950,434

(22) Filed: Apr. 11, 2018

(65) Prior Publication Data
US 2019/0317769 A1    Oct. 17, 2019

(51) Int. Cl.
*G06F 9/38* (2018.01)

(52) U.S. Cl.
CPC .......... *G06F 9/3806* (2013.01); *G06F 9/3867* (2013.01)

(58) Field of Classification Search
CPC .... G06F 9/3806; G06F 9/3808; G06F 9/3867; G06F 9/3848
(Continued)

(56) References Cited

U.S. PATENT DOCUMENTS

| 6,178,498 B1* | 1/2001 | Sharangpani ......... G06F 9/3005 711/213 |
| 2001/0047467 A1* | 11/2001 | Yeh ....................... G06F 9/3806 712/228 |

(Continued)

FOREIGN PATENT DOCUMENTS

| EP | 2202635 A1 | 6/2010 |
| WO | 0014628 A1 | 3/2000 |

OTHER PUBLICATIONS

Jin, W et al. The Study of Hierarchical Branch Prediction Architecture. 14th IEEE International Conference on Computational Science and Engineering, Aug. 2011, pp. 16-20 [online], [retrieved on Oct. 31, 2019]. Retrieved from the Internet <URL: https://ieeexplore.ieee.org/document/6062846> <DOI: 10.1109/CSE.2011.18>.*

(Continued)

*Primary Examiner* — Aimee Li
*Assistant Examiner* — Shawn Doman
(74) *Attorney, Agent, or Firm* — Vierra Magen Marcus LLP

(57) ABSTRACT

Branch prediction techniques are described that can improve the performance of pipelined microprocessors. A microprocessor with a hierarchical branch prediction structure is presented. The hierarchy of branch predictors includes: a multi-cycle predictor that provides very accurate branch predictions, but with a latency of multiple cycles; a small and simple branch predictor that can provide branch predictions for a sub-set of instructions with zero-cycle latency; and a fast, intermediate level branch predictor that provides relatively accurate branch prediction, while still having a low, but non-zero instruction prediction latency of only one cycle, for example. To improve operation, the higher accuracy, higher latency branch direction predictor and the fast, (Continued)

lower latency branch direction predictor can share a common target predictor.

19 Claims, 7 Drawing Sheets

(58) Field of Classification Search
USPC .................................................. 712/239, 205
See application file for complete search history.

(56) References Cited

U.S. PATENT DOCUMENTS

| | | | |
|---|---|---|---|
| 2004/0225872 A1* | 11/2004 | Bonanno | G06F 9/3848 |
| | | | 712/239 |
| 2005/0149707 A1* | 7/2005 | Jourdan | G06F 9/3848 |
| | | | 712/239 |
| 2005/0268075 A1* | 12/2005 | Caprioli | G06F 9/3806 |
| | | | 712/239 |
| 2007/0038844 A1 | 2/2007 | Valentine et al. | |
| 2008/0005545 A1* | 1/2008 | Yip | G06F 9/30054 |
| | | | 712/239 |
| 2010/0115248 A1 | 5/2010 | Ouziel et al. | |
| 2012/0303933 A1* | 11/2012 | Manet | G06F 15/17337 |
| | | | 712/30 |
| 2013/0151823 A1 | 6/2013 | Beaumont-Smith et al. | |
| 2014/0245317 A1 | 8/2014 | Chandra | |
| 2015/0046691 A1* | 2/2015 | Heil | G06F 9/3844 |
| | | | 712/240 |
| 2015/0121050 A1* | 4/2015 | Williams | G06F 9/30058 |
| | | | 712/238 |
| 2016/0098277 A1 | 4/2016 | Day et al. | |
| 2016/0216972 A1* | 7/2016 | Levitan | G06F 9/30058 |
| 2016/0306632 A1* | 10/2016 | Bouzguarrou | G06F 9/3848 |
| 2017/0068539 A1* | 3/2017 | Dundas | G06F 9/3806 |
| 2017/0262287 A1* | 9/2017 | Abdallah | G06F 9/3806 |
| 2019/0227804 A1* | 7/2019 | Mukherjee | G06F 9/3867 |
| 2019/0303160 A1* | 10/2019 | Greenhalgh | G06F 9/3806 |

OTHER PUBLICATIONS

Loh, GH et al. Predicting conditional branches with fusion-based hybrid predictors. Parallel Architectures and Compilation, Sep. 2002, pp. 165-176 [online], [retrieved on Oct. 31, 2019]. Retrieved from the Internet <URL: https://ieeexplore.ieee.org/abstract/document/1106015> <DOI: 10.1109/PACT.2002.1106015>.*
U.S. Appl. No. 16/054,413, filed Aug. 3, 2018 by Wang et al.
Jimenez, Daniel A., et al., "Dynamic Branch Prediction with Perceptrons," Proceedings of the 7th International Symposium on High-Performance Computer Architecture, Jan. 2001, 10 pages.
Seznec, Andre, "The L-TAGE Branch Predictor," Journal of Instruction-Level Parallelism 9, May 2007, 13 pages.
International Search Report dated Jul. 26, 2019 in PCT Application No. PCT/CN2019/082112, 9 pages.
Response to Non-final Office Action dated Mar. 11, 2019, U.S. Appl. No. 16/054,413, filed Aug. 3, 2018.
Non-final Office Action dated Dec. 11, 2019, U.S. Appl. No. 16/054,413, filed Aug. 3, 2018.
Final Office Action dated May 13, 2020, U.S. Appl. No. 16/054,413, filed Aug. 3, 2018.
Buchanan, William J., "Arithmetic Operator," ScienceDirect, 1997, 1 page.
Response to Final Office Action dated Aug. 13, 2020, U.S. Appl. No. 16/054,413, filed Aug. 3, 2018.

* cited by examiner

ACCURATE EARLY BRANCH PREDICTION USING MULTIPLE PREDICTORS HAVING DIFFERENT ACCURACY AND LATENCY IN HIGH-PERFORMANCE MICROPROCESSORS

FIELD

The following is related generally to the field of microprocessors and, more specifically, to branch prediction in pipelined microprocessors.

BACKGROUND

Accurate branch prediction is critical for modern high-performance pipelined microprocessors to reduce the severe performance penalty caused by branch mispredictions. Modern state-of-the-art microprocessors commonly have sophisticated branch predictors with very low branch misprediction rates. However, due to the complexity of those branch predictors, they take two or more cycles to make a prediction, so that the pipeline has to wait two or more cycles to make the next prediction. Although they can be quite accurate, this long prediction latency lowers instruction fetch throughput and hurts overall performance.

SUMMARY

According to one aspect of the present disclosure, there is provided a microprocessor including a fetch stage configured to retrieve instructions from a memory, a buffer configured to store instructions retrieved by the fetch stage, one or more pipelined stages configured to execute instructions stored in the buffer, and a predictor. The predictor includes a target predictor, a first direction predictor, and a second direction predictor. The target predictor is connected to the fetch stage and configured to predict branch/target pairs for instructions stored in the buffer. The first direction predictor is connected to the target predictor and configured to predict with a first accuracy a first branch path for each of the branch/target pairs and provide the fetch stage the predicted first branch paths with a latency of a first number of cycle. The second direction predictor is connected to the target predictor and configured to predict with a second accuracy lower than the first accuracy a second branch path for each of the branch/target pairs and provide the fetch stage the predicted second branch paths with a latency of a second number of cycles. The second number of cycles is smaller than the first number of cycles.

Optionally, in the preceding aspect, another implementation of the aspect provides that the predictor further includes a branch predictor configured to predict branch paths of instructions stored in the buffer for a sub-set of instructions and having a latency of zero cycles.

Optionally, in the preceding aspects, another implementation of the aspects provides that the target predictor is configured to predict branch/target pairs in one cycle.

Optionally, in the preceding aspect, another implementation of the aspects provides that the target predictor comprises branch target buffers.

Optionally, in some of the preceding aspects, another implementation of the aspects provides that the second number of cycles is one.

Optionally, in the preceding aspects, another implementation of the aspects provides that the number of second branch paths predicted by the second direction predictor in a single pipeline cycle is M, where M is less than then the maximum number of instructions retrieved by the fetch stage in the single pipeline cycle, and the second direction predictor predicts a subset of the instructions fetched in the single pipeline cycle corresponding to M branches having the earliest addresses.

Optionally, in the preceding aspects, another implementation of the aspects provides that the number of second branch paths predicted by the second direction predictor in a single pipeline cycle is M, where M is the maximum number of instructions retrieved by the fetch stage in the single pipeline cycle.

Optionally, in the preceding aspects, another implementation of the aspects provides that the first direction predictor is connected to receive from the one or more pipelined stages indications of whether the predicted first branch paths were correctly predicted, and the first predictor is connected to the second predictor, the second predictor being configured to be trained by the first predictor based on the indications of whether the second paths were correctly predicted.

Optionally, in the preceding aspects, another implementation of the aspects provides that the second predictor is configured to have a smaller amount of memory than the first predictor.

Optionally, in the preceding aspects, another implementation of the aspects provides that for a set of instructions retrieved by the fetch stage in a single pipeline cycle, the second predictor determines the second branch paths beginning with the branch/target pair with the earliest address.

Optionally, in the preceding aspects, another implementation of the aspects provides that the first direction predictor and the second direction predictor are connected to receive from the one or more pipelined stages indications of whether the predicted first and second branch paths were correctly predicted and are configured to update the first and second branch path predictions based on the indications.

Optionally, in the preceding aspects, another implementation of the aspects provides that the first direction predictor is connected to receive from the one or more pipelined stages indications of whether the predicted first branch paths were correctly predicted, configured to update the first branch path predictions based on the indications, and connected to the second direction predictor to update the second branch path predictions.

According to another aspect of the present disclosure, there is provided a microprocessor includes a pipelined computing structure and a hierarchical branch predictor. The pipelined computing structure includes a fetch stage configured to fetch instructions from a memory, a buffer configured to store instructions fetched by the fetch stage, and one or more subsequent stages configured to execute instructions stored in the buffer. The hierarchical branch predictor configured to predict branch paths taken for instructions stored in the buffer and provide the fetch stage the predicted branch paths. The hierarchical branch predictor includes a zero-cycle branch predictor, a first branch predictor and a second branch predictor. The zero-cycle branch predictor is configured to predict branch paths of instructions stored in the buffer for a sub-set of instructions with a latency of zero pipeline cycles. The first branch predictor is configured to predict branch paths of instructions stored in the buffer with a latency of a plurality of pipeline cycles. The second branch predictor is configured to predict branch paths of instructions stored in the buffer having a branch prediction accuracy intermediate to the zero-cycle branch predictor and the first branch predictor with a non-zero latency of a lower number of pipeline cycles than the first branch predictor.

Optionally, in the preceding aspect, another implementation of the aspect provides that the hierarchical branch predictor further includes a target predictor connected to the buffer and configured to predict branch/target pairs for instructions stored in the buffer. The first branch predictor includes a first direction predictor connected to the target predictor and configured to predict a corresponding branch taken for each of the branch/target pairs, and the second branch predictor includes a second direction predictor connected to the target predictor and configured to predict a corresponding branch taken for each of the branch/target pairs.

Optionally, in the preceding aspect, another implementation of the aspect provides that the number of branch paths predicted by the second branch predictor in a single pipeline cycle is M, where M is less than then the maximum number of instructions retrieved by the fetch stage in the single pipeline cycle, and the second direction predictor predicts a subset of the instructions fetched in the single pipeline cycle corresponding to M branches having the earliest addresses.

Optionally, in the preceding aspect, another implementation of some of the aspects provides that the second branch predictor is configured to predict branch paths with a latency of one pipeline cycle.

According to an additional aspect of the present disclosure, there is provided a of operating a pipelined computing structure method that includes predicting branch/target pairs for a first set of instructions fetched for execution in the pipelined computing structure. A first prediction of a first accuracy and a first latency is performed for a first branch to be selected for each of the predicted branch/target pairs when executing the first set of instructions. One or more additional instructions corresponding to the predicted first branches are fetched for execution in response to the corresponding first branch prediction being correct. A second prediction of a second accuracy lower than the first accuracy and a second latency lower than the first latency is performed for a second branch to be selected for each of the predicted branch/target pairs when executing the first set of instructions. One or more additional instructions corresponding to the predicted second branches are fetched for execution in response to the corresponding second branch prediction being correct.

Optionally, in the preceding aspect, another implementation of the aspect provides that the method further includes performing an additional prediction for a subset of the instructions fetched for execution in the pipelined computing structure, the additional prediction having a lower accuracy than the second accuracy and a latency of zero cycles; and fetching one or more additional instructions corresponding to the additional prediction in response to the corresponding additional prediction being correct.

Optionally, in some of the preceding aspect, another implementation of the aspect provides that the method further includes executing the first set of instruction; subsequently receiving indications of whether the first branches and second branches were correctly predicted; and updating the first and second predictions based on the indications.

Optionally, in the preceding aspect, another implementation of the aspect provides that the method further includes executing the first set of instruction; subsequently receiving indications of whether the first branches were correctly predicted; and updating the first and second predictions based on the indications.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the Background.

BRIEF DESCRIPTION OF THE DRAWINGS

Aspects of the present disclosure are illustrated by way of example and are not limited by the accompanying figures for which like references indicate elements.

DETAILED DESCRIPTION

The following presents examples of branch prediction techniques that can improve the performance of pipelined microprocessors. A microprocessor with a hierarchical branch prediction structure is presented, where the hierarchy includes a multi-cycle branch predictor, a 0-cycle branch predictor, and a fast, intermediate level branch predictor. The multi-cycle branch predictor provides accurate branch predictions, but with a latency of multiple cycles. The small and simple 0-cycle branch predictor can provide branch predictions for a sub-set of instructions with zero-cycle latency, but with lower accuracy and only for instruction that have been recently used with high frequency. The fast, intermediate level branch predictor provides relatively accurate branch prediction, while still having a low, but non-zero instruction prediction latency of only one cycle, for example. To improve operation, the higher accuracy, higher latency branch direction predictor and the fast, lower latency branch direction predictor can share a common target predictor.

It is understood that the present embodiments of the disclosure may be implemented in many different forms and that claims scopes should not be construed as being limited to the embodiments set forth herein. Rather, these embodiments are provided so that this disclosure will be thorough and complete and will fully convey the inventive embodiment concepts to those skilled in the art. Indeed, the disclosure is intended to cover alternatives, modifications and equivalents of these embodiments, which are included within the scope and spirit of the disclosure as defined by the appended claims. Furthermore, in the following detailed description of the present embodiments of the disclosure, numerous specific details are set forth in order to provide a thorough understanding. However, it will be clear to those of ordinary skill in the art that the present embodiments of the disclosure may be practiced without such specific details.

Figure 1A:
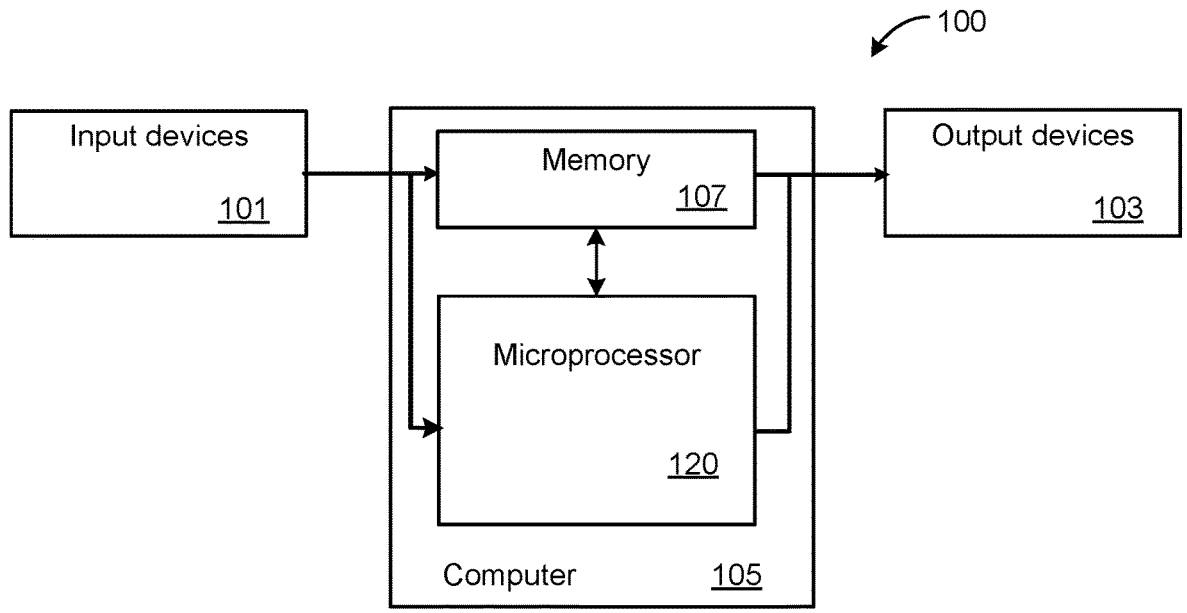
FIGS. 1A and 1B are respectively block diagrams of a computer system and a microprocessor that can be incorporated into such a computer system.
Figure 1B:
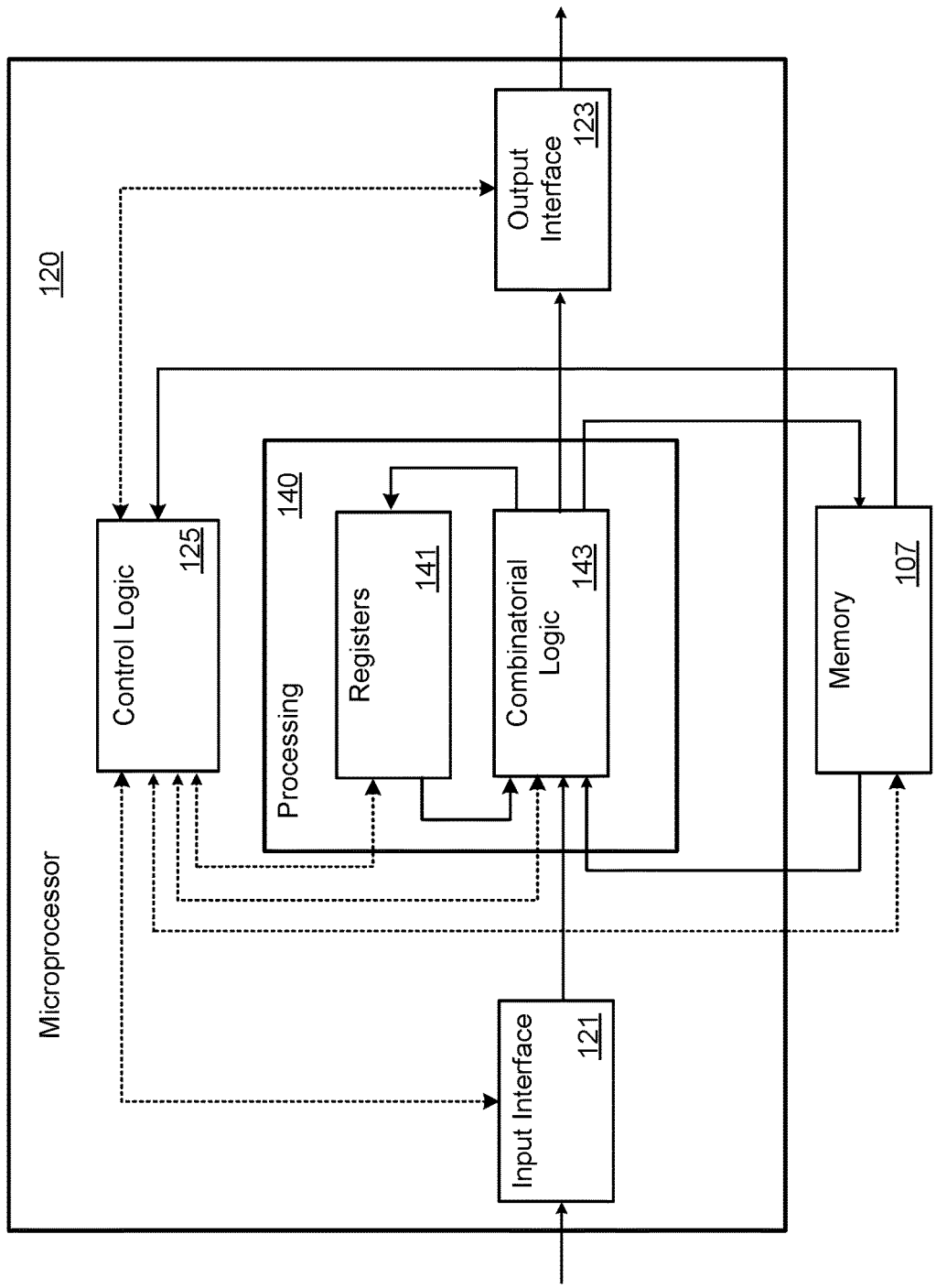

FIGS. 1A and 1B are respectively block diagrams of a computer system and a microprocessor such as can be incorporated into such a computer system. In the simplified representation of FIG. 1A, the computer system 100 includes a computer 105, one or more input devices 101 and one or more output devices 103. Common examples of input devices 101 include a keyboard or mouse. Common examples of output devices 103 include monitors or printers. The computer 105 includes memory 107 and microprocessor 120, where in this simplified representation the memory 107 is represented as a single block. The memory 107 can include ROM memory, RAM memory and non-volatile memory and, depending on the embodiment, include separate memory for data and instructions.

FIG. 1B illustrates one embodiment for the microprocessor 120 of FIG. 1A and also includes the memory 107. In the representation of FIG. 1B, the microprocessor 120 includes control logic 125, a processing section 140, an input interface 121, and an output interface 123. The dashed lines represent control signals exchanged between the control logic 125 and the other elements of the microprocessor 120 and the memory 107. The solid lines represent the flow of data and instructions within the microprocessor 120 and between the microprocessor 120 and memory 107.

The processing block 140 includes combinatorial logic 143 that is configured to execute instructions and registers 141 in which the combinatorial logic stores instructions and data while executing these instructions. In the simplified representation of FIG. 1B, specific elements or units, such as an arithmetic and logic unit (ALU), floating point unit, and other specific elements commonly used in executing instructions are not explicitly shown in the combinatorial logic 143 block. The combinatorial logic 143 is connected to the memory 107 to receive and execute instruction and supply back the results. The combinatorial logic 143 is also connected to the input interface 121 to receive input from input devices 101 or other sources and to the output interface 123 to provide output to output devices 103 or other destinations.

Figure 2:
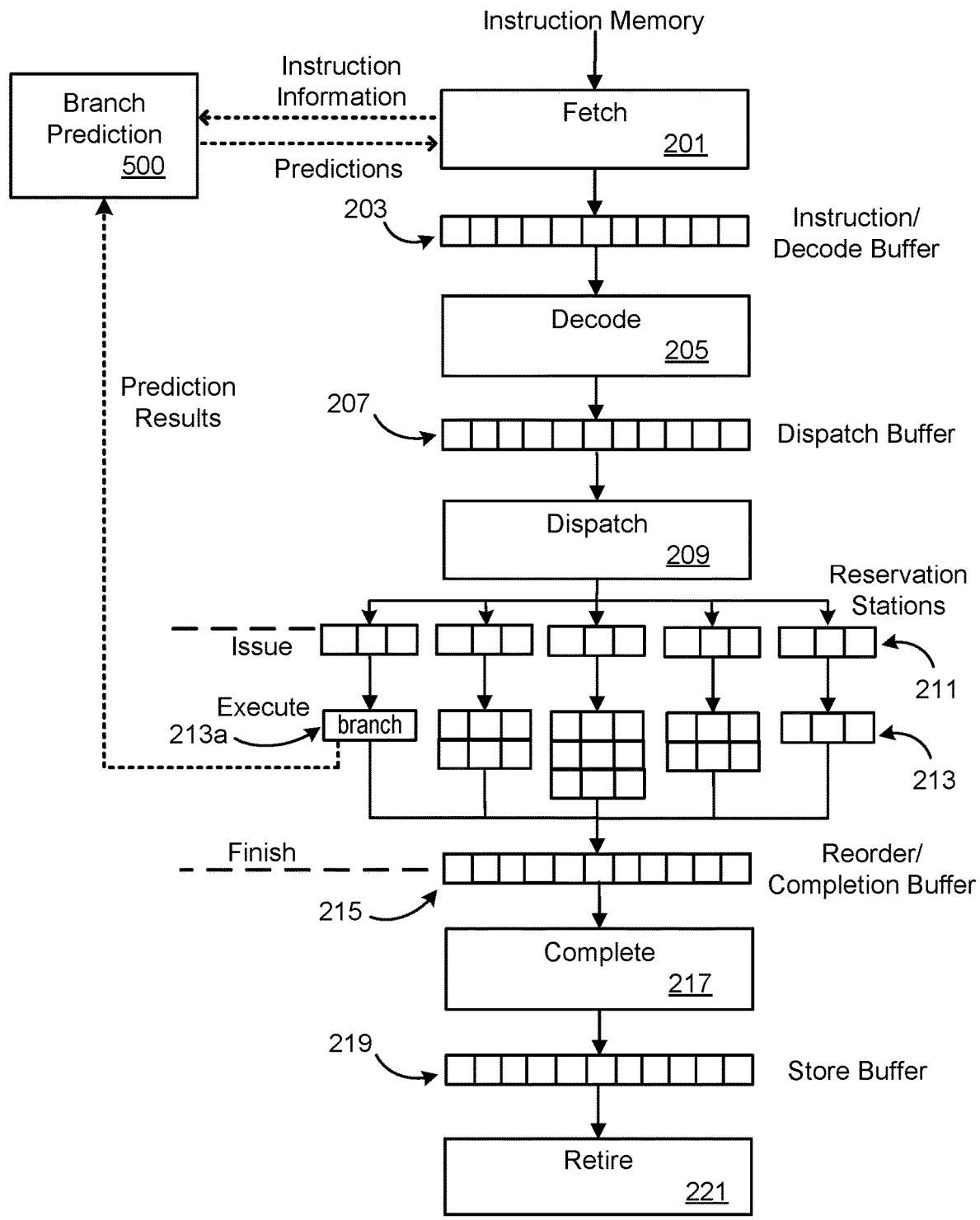
FIG. 2 illustrate the pipelined of a microprocessor like that of FIG. 1B.

FIG. 2 schematically illustrates an embodiment of the pipelined operation of a microprocessor such as can be used in the processing section 140 of microprocessor 120 represented in FIG. 1B. In FIG. 2, the different stages of the pipeline can be executed by the combinatorial logic 143, with the various buffers being part of the registers 141. Depending on the embodiment, the various pipeline stages can be executed though software, hardware elements, firmware, of various combinations of these as further discussed below with respect to FIG. 7. The registers 141, including the various buffers explicitly represented in FIG. 2, are commonly implemented as volatile random access memory (RAM), but some embodiments may also employ some amount of non-volatile memory.

Pipelined microprocessors have a number of variations, where the embodiment of FIG. 2 shows a fairly typical example of a microprocessor integrated circuit in a block representation, but other embodiments can have differing numbers of stages with differing names and functions and can be implemented in hardware, firmware, software and various combinations of these. In FIG. 2, the first stage is a fetch stage 201 that retrieves instructions from the instruction memory and loads them in an instruction/decode buffer 203. The fetched instruction can be stored in the instruction/decode buffer based on the starting and ending addresses of a fetch block and ordered from earliest to latest.

The subsequent stages of the pipeline decode and execute the fetched instructions loaded into the instruction/decode buffer 203, where the embodiment of FIG. 2 illustrates these subsequent stages as a particular set of stages and buffers. Other microprocessor embodiments may have more or fewer stages and may use differing names, but FIG. 2 can be taken as a representative embodiment for purposes of this discussion. In the example of FIG. 2, the various functional stages are represented as blocks and can be implemented through various logic circuitry on the microprocessor's integrated circuit, depending on the embodiment; and buffer sections are represented as the series of smaller squares, where these buffers can be implemented by RAM or other memory and may be distinct or portions of a shared memory, again depending on the embodiment.

The next stage in the pipeline is decode stage 205, which decodes the instructions from the instruction/decode buffer 203 and places them in the dispatch buffer 207 for subsequent execution. Dispatch stage 209 issues the decoded instructions, distributing them to reservation stations 211, after which they are executed as grouped at 213. The results upon finishing execution are then placed in the reorder/completion buffer 215, pass through completion stage 217 and then go to the store buffer 219. Finally, the pipeline ends with the retire stage 221, with any results being written back to memory or provided as output as needed.

The pipeline structure allows for efficient execution of instructions, as while one set of instructions is at one stage, the next set can follow a cycle behind in the preceding stage. However, if an instruction is a branch instruction, such as an if-then-else or a jump type instruction, once this instruction is to be executed the pipeline can be stalled out until a needed new instruction is fetched and propagates though the pipeline. For example, FIG. 2 shows a branch instruction at 213a in the far-left slot of the execute stage. A taken branch can only redirect instructions when executed. If this branch requires another instruction to be fetched, this will need to be reported back to the fetch stage 201 so that it can retrieve the needed instruction, which must then propagate through the pipeline. In a modern, deep pipelined microprocessor, this may take 10 or more cycles after being fetched. This results in a large cost in both performance and power, as more than 10 cycles are wasted and, for superscalar microprocessors where multiple pipelines run in parallel, more than 60 instructions in a wrong path being fetched and flushed in a 6-wide superscalar example.

To improve performance, a microprocessor can use branch prediction, where if an instruction with a branch is fetched, the result of this branch can be predicted, and any needed instructions can then be fetched and speculatively executed. If the prediction is correct, the needed instruction will already be available in the pipeline; while if the prediction is incorrect, the needed instructions will then need to be fetched and the mis-predicted instructions flushed. FIG. 2 includes such a branch predictor 500. The branch predictor 500 receives information on branching instructions that have been fetched and then makes predictions for instructions to be fetched and speculatively executed. The branch predictor 500 can predict the starting and ending addresses of a fetch block, then the fetch stage 201 can use this information to fetch the actual instructions of the fetch block. The correctness of a branch prediction is determined after the branch is executed.

Consequently, accurate branch prediction is very important for modern high-performance microprocessors in order to reduce severe the performance penalty caused by branch mispredictions. Modern state-of-the-art microprocessors commonly employ sophisticated branch predictors with very low branch misprediction rates; however, due to the complexity of these branch predictors (called n-cycle predictor), they have to take 2 or more cycles to make a prediction (i.e., it has to wait 2 or more cycles to make the next prediction once it predicts). This long prediction latency lowers instruction fetch throughput and hurts overall performance.

An n-cycle branch predictor usually includes a "target predictor" and a "direction predictor". A target prediction for the target predictor includes one or more branch/target pairs in the given fetch block, while the direction prediction predicts whether any instruction of the fetch block is taken or not. Those two pieces of information are combined to choose the earliest taken branch in the fetch block. If none is chosen, the fetch block is predicted not taken. Most target predictors, e.g., branch target buffers (BTBs), can be looked up in 1 cycle, while a state-of-the-art direction predictor needs at least a few cycles to get results.

As a remedy for the long prediction latency of the n-cycle predictor, small and simple branch predictors (called "0-cycle predictors" in the following) can also be used to predict a small set of frequently executed branches with a 0-cycle bubble. However, to meet the 0-cycle requirement, they have to sacrifice size and prediction accuracy, making them unsuitable to predict the majority of branches in many complex applications.

Figure 3:
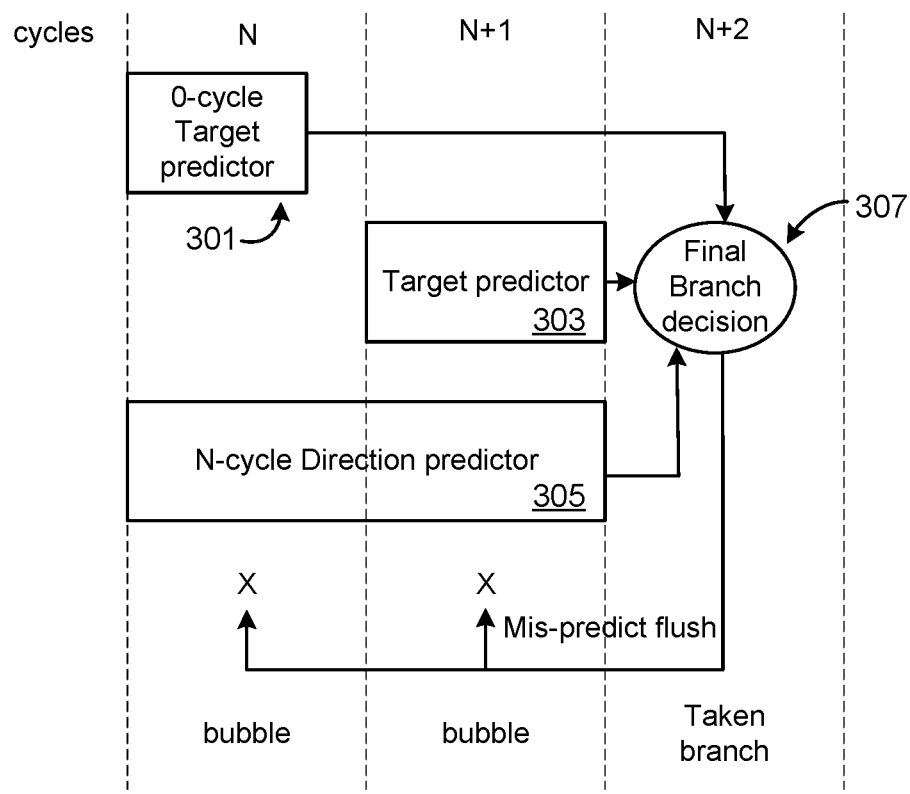
FIG. 3 illustrates a branch prediction arrangement using both a 0-cycle target predictor and an n-cycle direction predictor.

FIG. 3 illustrates a branch prediction arrangement using both a 0-cycle target predictor 301 and an n-cycle (2-cycle in this example) direction predictor 305. Across the top are shown the cycle number of the pipeline, starting at cycle N. After determining an instruction has a branch, predictions are made starting at cycle N. The 0-cycle target predictor 301 can make predictions for a set of instruction that are "hot", in that they have frequently executed recently; and if the instruction is in this set, a prediction is made. The prediction from the 0-cycle target predictor 301 may have fairly good accuracy for the subset of hot instructions and provide these in the cycle after the instructions are fetched with 0-cycle latency, but more generally will not be particularly accurate or not provide a prediction at all for instruction that have not been used recently and frequently.

Additionally, at cycle N, the n-cycle direction predictor 305 sets to work to determine whether or not the branch will be taken or not, where in this example a 2-cycle direction predictor is shown. The n-cycle direction predictor 305 works in conjunction with the target predictor 303. As the target predictor 303 can typically work in a single cycle, this can provide the branch target pairs as cycle N+1 for the 2-cycle direction predictor 305 of the example. At cycle N+2, the 0-cycle target predictor 301, 2-cycle direction predictor 305 and target predictor 303 all contribute to the final branch decision 307. This results in a bubble (or gap) in the pipeline of 2 cycles (more generally, for an n-cycle direction predictor, this would be at cycle N+n with a latency of n cycles.) Consequently, when the 2-cycle direction predictor 305 is used for consecutive taken branch prediction, a string of 2-cycle bubbles is incurred with pipeline pattern of . . . B B T B B T . . . , where T indicates a taken branch and B indicates a bubble, so that a prediction is only made every third cycle. FIG. 3 also represents a mis-predict flush path out of the final branch decision, where X indicates the pipeline is flushed due to 0-cycle target predictor 301 mis-prediction.

Consequently, although a multiple-cycle branch predictor 305 may be quite accurate, resulting in a relatively infrequent need to flush the pipeline, it may still introduce a high number of bubbles. To improve this situation, the following introduces an intermediate 1-cycle (or, more generally, more than 0, but less than n, cycle) branch predictor to complement the 0- and n-cycle branch predictors to further improve overall microprocessor performance by improving branch prediction rate and instruction fetch throughput. It accomplishes this goal by having higher prediction capacity and accuracy than the 0-cycle target predictor 301, while maintaining lower prediction latency than the n-cycle predictor 305. These three levels of prediction can be combined to provide a hierarchy of branch prediction, which each of the three levels providing progressively higher accuracy, but at the cost of higher latency.

Like the n-cycle predictor, the 1-cycle predictor also has a target predictor and a direction predictor. The 1-cycle target predictor can re-use the n-cycle target predictor. This significantly reduces the hardware cost of the 1-cycle predictor, as it requires relatively little additional RAM memory, such as little as 512 bits of hardware cost. Both the hierarchical structure and sharing of a target predictor can be illustrated with respect to FIGS. 4 and 5.

Figure 4:
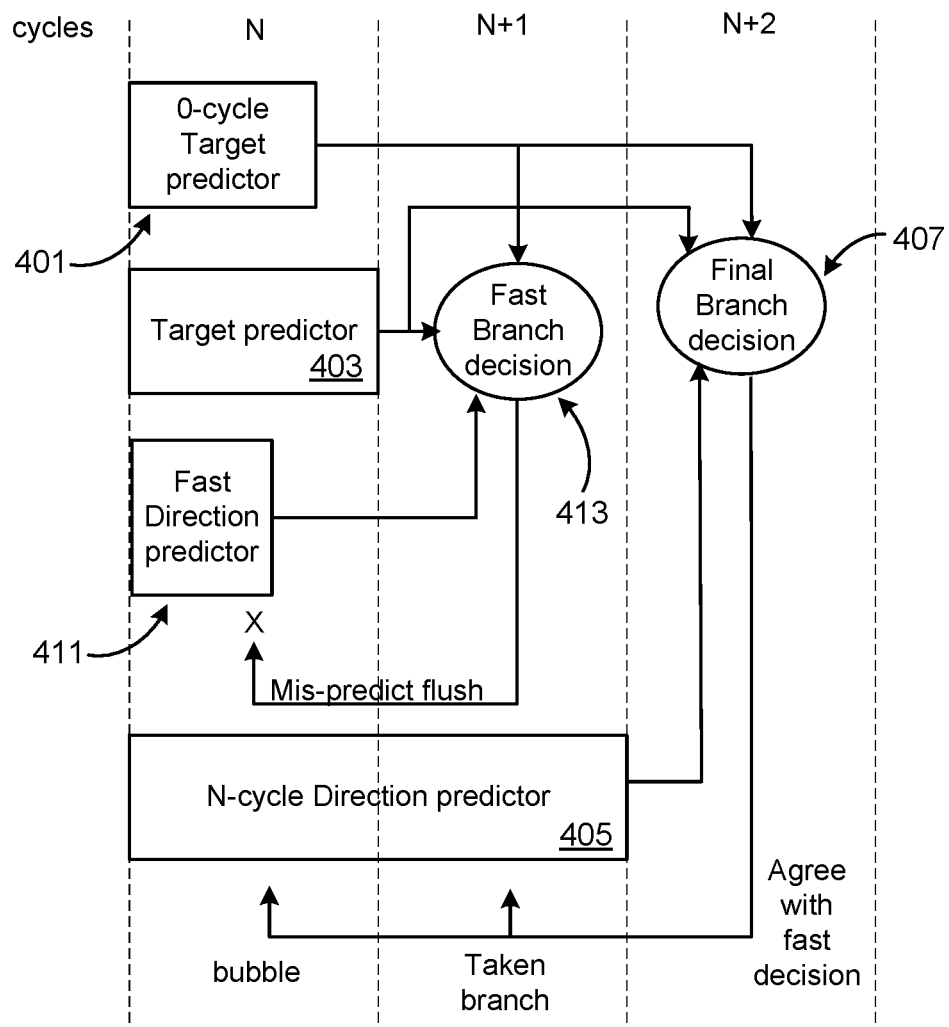
FIG. 4 illustrates a branch prediction arrangement that incorporates a fast 1-cycle direction predictor, along with a 0-cycle target predictor and an n-cycle direction predictor.

FIG. 4 illustrates a branch prediction arrangement that incorporates a fast 1-cycle direction predictor 411, along with a 0-cycle target predictor 401 and an n-cycle direction predictor 405. FIG. 4 repeats many of the elements of FIG. 3 with respect to the 0-cycle and n-cycle predictors. As in FIG. 3, across the top are shown the cycle number of the pipeline, after determining an instruction has a branch, predictions are made starting at cycle N. The 0-cycle predictor 401 can make predictions for a set of instruction that they have frequently executed recently. The n-cycle (2-cycle in this embodiment) direction predictor 405 and target predictor 403 again provide the final branch decision at cycle N+2. Of the elements in FIG. 3 that are repeated in FIG. 4, a difference is now that the target predictor result is now moved back a cycle to cycle N+1. As in FIG. 3, X again indicates that the pipeline is flushed due to a 0-cycle predictor 401 mis-prediction.

Relative to FIG. 3, FIG. 4 includes the intermediate 1-cycle fast direction predictor 411. (The embodiments described here is for a 1-cycle direction predictor, but more generally this intermediate fast direction predictor can be for some non-zero number of cycles less than n.) In addition to the final branch decision 407 at cycle N+2, the 1-cycle fast direction predictor 411 and target predictor 403 also provide a fast branch decision 413 at cycle N+1, which also receives input from the 0-cycle target predictor 401. Although not as accurate as the n-cycle direction predictor 405, the 1-cycle fast direction predictor 411 can provide a high level of accuracy for those predictions missed by the 0-cycle target predictor 401 with only a bubble of a single cycle. For example, when the 1-cycle predictor 411 makes correct consecutive taken branch prediction, it only incurs 1-cycle bubbles with pipeline a pattern of . . . B T B T B T . . . , where T indicates a taken branch and B indicates a bubble. This can be a significant improvement in performance relative to the corresponding . . . B B T B B T . . . pattern without the 1-cycle direction predictor.

Figure 5:
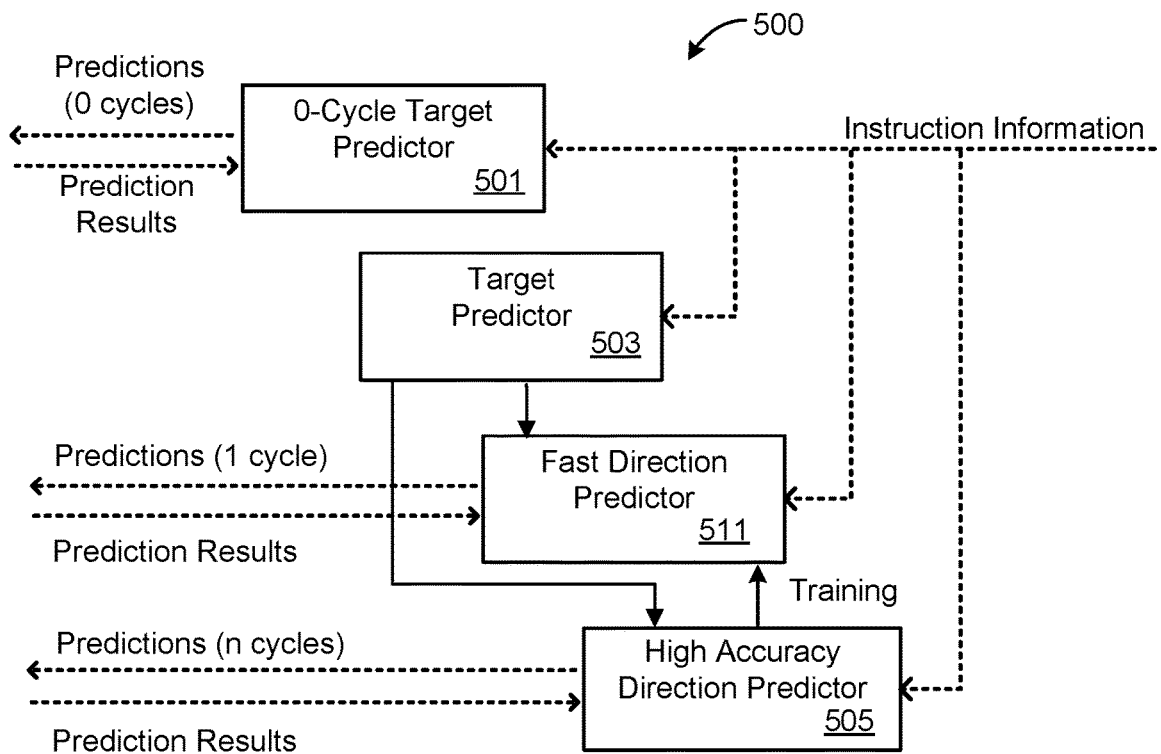
FIG. 5 provides more detail for an embodiment of the branch prediction block of FIG. 2.

FIG. 5 provides more detail for an embodiment of the branch predictor block 500 of FIG. 2. In the block diagram of FIG. 5, the branch predictor block 500 includes a 0-cycle target predictor 501, a target predictor 503, and a 2-cycle (or more generally, a n-cycle, for n≥2) high accuracy direction predictor 505. The embodiment of FIG. 5 also includes fast direction predictor 511. In this embodiment, fast direction predictor 511 is a 1-cycle direction predictor, but more generally will have a latency of 1 or more, but less than n, cycles, placing it intermediate in the prediction hierarchy between the 0-cycle target predictor 501 and the n-cycle direction predictor 505 in both latency and accuracy. Although typically less accuracy than an n-cycle direction predictor, which can have very high hit rates, the 1-cycle direction predictor 511 can still obtain high levels of accuracy.

Each of 0-cycle target predictor 501, target predictor 503, fast direction predictor 511 and high accuracy direction predictor 505 are connect to the fetch stage 201 to receive instruction information. Depending on the embodiment, the directional and target predictors need not look at the actual instructions. There can be based on tables (sometimes partially) indexed by the starting address of a fetch block (i.e., a group of instructions to be fetched at once), and the table entry can predict one or more branches in the fetch block by storing the branches' positions in the fetch block. A branch's position can be relative to the fetch block starting address (e.g., starting address 0×8004, branch at 0×800C, with 4B instruction size, the position is (0×800C−0×8004)/4=2) or align to the cacheline size (e.g., with 64B cacheline and 4B instruction sizes, address 0×8004 has a position of ((0×8004 mod 64) div 4)=1) Those are learnt only after the same fetch block is already executed one or more times, so the predictors get updated to learn newly appeared branches based on execution results.

The target predictor 503 generates a prediction that includes one or more branch/target pairs in the given fetch block. Most target predictors, such as branch target buffers (BTBs), can be looked up in 1 cycle. The 1-cycle and n-cycle direction predictors 511 and 505 each predict whether any instruction of the fetch block is taken or not, where for each of the direction predictors this information is combined with the branch/target pairs from target predictor 503 to choose the earliest taken branch in the fetch block. If none is chosen, the fetch block is predicted not taken. The fast direction predictor 511 provides its prediction in 1-cycle, while the high accuracy direction predictor 505 provides its prediction after n-cycles.

The branch/target pairs from the target predictor 503 are used by both the high accuracy direction predictor 505 and the fast direction predictor 511 and would be present for embodiments without the fast direction predictor 511. As the target predictor 503 can be accessed in 1 cycle, this allows the fast direction predictor 511 to reuse the target predictor 503, one of the most costly structures in the microprocessor. Due to this sharing of resources, the hardware requires for including the fast direction predictor 511 on the microprocessor integrated circuit are relatively modest since, in addition to using some logic circuit it can implemented with relatively small RAM requirements (as little as 512 bits, for example).

By having the fast direction predictor 511 reuse the same branch target predictor 503 as the n-cycle target predictor 505, and by predicting the earliest branches, the introduction of the fast direction predictor 511 incurs minimal cost to achieve high performance. As FIG. 4 illustrates, under this arrangement when the 0-cycle predictor 501 fails and the n-cycle target predictor 505 agrees with the 1-cycle prediction, there is 1-cycle bubble for every prediction, rather than the 2-cycle bubble under the arrangement of FIG. 3. Consequently, the introduction of the 1-cycle predictor 511 complements the 0-cycle and n-cycle branch predictors to improve branch prediction rate and instruction fetch throughput.

Each of 0-cycle target predictor 501, fast direction predictor 511 and high accuracy direction predictor 505 provide their predictions to the fetch stage 201 of the pipeline so that the predicted instruction can be retrieved. Each of 0-cycle target predictor 501, fast direction predictor 511 and high accuracy direction predictor 505 are also connected to receive the results of their predictions based on the execution of the instructions so that the predictors get updated. The 1-cycle direction predictor 511 can also be trained by the n-cycle direction predictor.

With respect to updating the 1-cycle fast direction predictor 511, in some embodiments this can be done by the n-cycle high accuracy direction predictor 505. The shortened update delays allow for mis-predictions to be corrected faster. This also allows for the 1-cycle fast direction predictor 511 to be hidden from later pipeline stages for easier logic design and route placement. In some embodiments updates to the 1-cycle fast direction predictor 511 can additionally or alternately be made when a branch resolves or retires, which can be more accurate and result in fewer updates than training by the n-cycle high accuracy direction predictor 505. The 1-cycle fast direction predictor 511 can be updated when any of the earliest m branches of the current fetch block is conditional. Selective updating helps reduce aliasings to the prediction table and allows the 1-cycle branch predictor to be small while still maintaining good performance.

Figure 6:
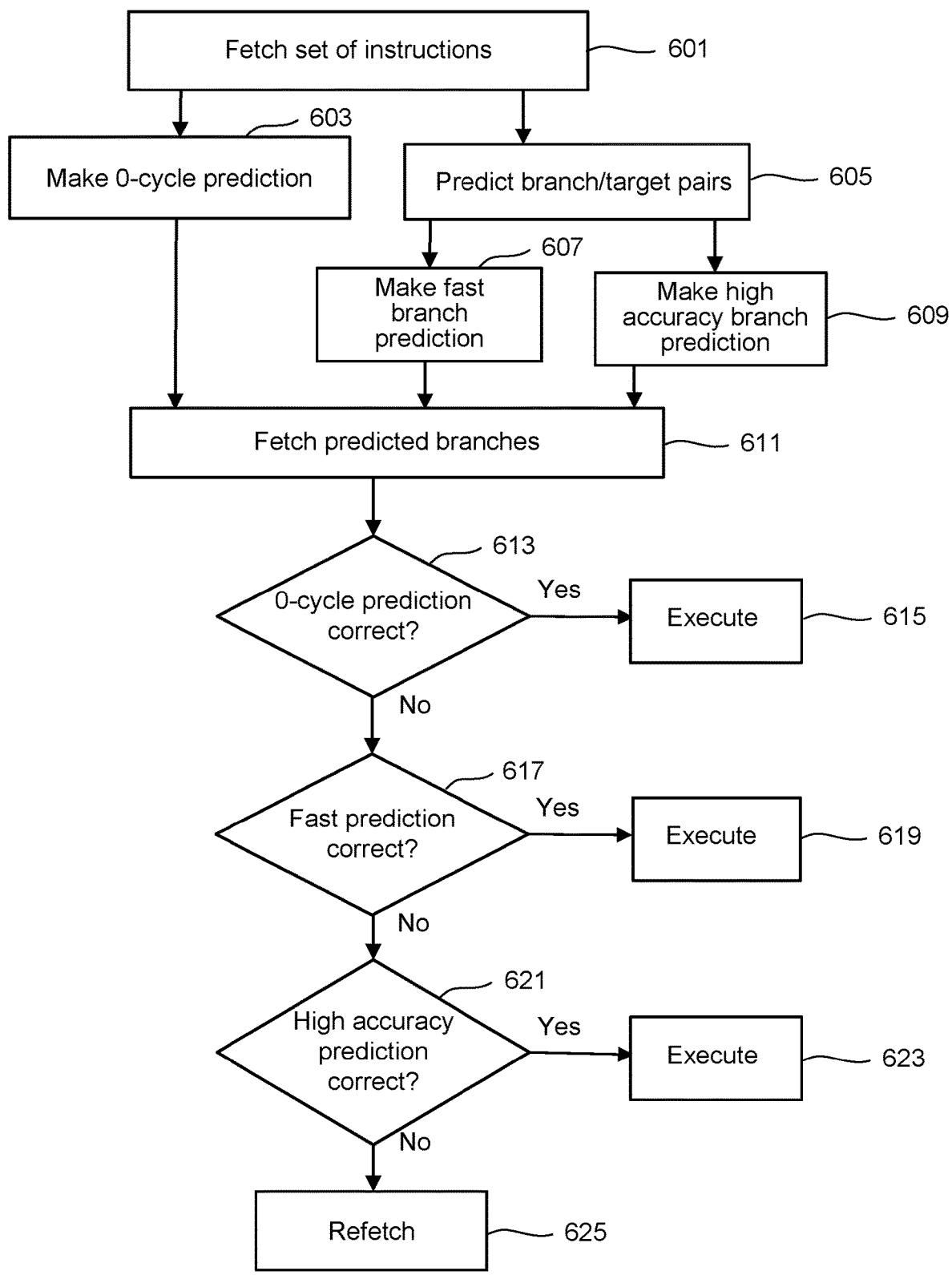
FIG. 6 is a flow illustrating the operation of the microprocessor of FIG. 2 for the embodiments using a branch predictor as illustrated in FIG. 5.

FIG. 6 is a flow illustrating the operation of the microprocessor of FIG. 2 for the embodiments using a branch predictor as illustrated in FIG. 5. The flow begins at 601 when an instruction is fetched. At 603, if there are instructions in the set for which the 0-cycle predictor 501 makes perditions, these are made and passed to the fetch stage 201 at the next cycle so that it can fetch the predicted instructions for speculative execution at 611. The target predictor 503 predicts branch/target pairs at 605 and the fast direction predictor 511 and high accuracy direction predictor 505 respectively make their predictions at 607 and 609, based upon which the fetch stage 201 fetches the predicted instructions for speculative execution at 611. As described above, at 603, 605, 607 and 609, the directional and target predictors need not look at the actual instructions, but can instead use tables (sometimes partially) indexed by the starting address of a fetch block (i.e., a group of instructions to be fetched at once), and the table entry can predict one or more branches in the fetch block by storing the branches' positions in the fetch block.

With respect to the timing of steps at 603, 605, 607 and 609 and the fetching of predicted instructions, an embodiment for this is illustrated in FIG. 4. As illustrated there, these occur after different numbers of cycles. As illustrated in the embodiment there, the 0-cycle prediction, fast branch prediction and high accuracy prediction respectively have a latency of 0, 1 and 2 cycles. Consequently, predicted branches for the prediction are respectively fetched at 611 with no bubble, a 1 cycle bubble, and a 2 cycle bubble in the instruction pipeline. The instructions fetched at 611 then propagate down the pipeline following the instructions from 601 that triggered the predications with gaps of these sizes.

Once the branching instruction is executed, it can be determined if the predictions were correct. The 0-cycle prediction is one cycle behind and if determined to be correct at 613, it then goes on to execution at 615. If the 0-cycle prediction was wrong, or there was no 0-cycle prediction, the 1-cycle fast branch perdition follows one cycle later (or, equivalently, two cycles after the triggering instruction) and, if determined correctly predicted at 617, is then executed at 619. If the fast direction prediction is not correct at 617, the prediction from a 2-cycle high accuracy predictor follows one cycle after the 1-cycle fast branch perdition (or, equivalently, two cycles after the triggering instruction). If the high accuracy prediction is determined correct at 621, it is then executed at 623. If the high accuracy prediction is also found to be a mis-prediction at 621, the pipeline is flushed and a refetch to retrieve the needed instruction is performed at 625.

Depending on the embodiment, the 1-cycle direction predictor can be of the bimodal variety, gshare variety, or any other scheme that can be looked up in 1 cycle. The number of branches predicted each time by the 1-cycle direction predictor, denoted m in the following, is a design choice, and is implemented by each predictor entry having m counters. The parameter m can be any value from 1 to the maximum number of instructions in a fetch block. In the case that m equals the maximum number of fetch block instructions, each branch can be mapped 1:1 to a counter in the selected predictor entry.

In the case that m is less than the maximum number of instructions in a fetch block, there are two implementation choices: 1) The predictor entry saves branch position along with the corresponding counter, and predicts a position only when both the directional and the target predictors have the position in their corresponding entries; 2) The predictor does not save branch position in the table. Instead, the branches from the target predictor are sorted by their relative positions to the start of the fetch block, and the selected directional counters are associated with the earliest m branches in this sorted order.

Starting from the earliest branch, the 1-cycle predictor makes one of the following predictions for each branch until one is predicted taken or an indirect branch, or all m branches are predicted non-taken:

Make no prediction:
if the branch is an indirect whose target is likely not in the target predictor;
if all m+1 branches are conditional, and all m direction predictions are non-taken; or
optionally, if the 0-cycle predictor predicts taken and the corresponding branch is the earliest.

Predict take:
if one of the branches is conditional and predicted taken; or
if one of the branches is unconditional whose target is in the target predictor or another target cache (e.g., return address stack) that can be accessed in one cycle.

As the 1-cycle and n-cycle target predictors share the same structure, there is no change to its updating scheme. The 1-cycle direction predictor can be updated from several locations, e.g., by the n-cycle predictor, at branch resolution time, at branch retire time, or a combination of these. Regardless of the updating location, the 1-cycle direction predictor can be updated when any of the earliest m branches of the current fetch block is conditional. In the case of m equals 1, the 1-cycle direction predictor is updated when the earliest branch is conditional. The selective updating helps reduce aliasings to the prediction table and allows the 1-cycle branch predictor to be small, while still maintaining good performance.

Consequently, the 1-cycle branch predictor achieves higher accuracy and predicts more branches than the 0-cycle predictor, while maintaining a lower prediction latency than the n-cycle predictor. Complementing the existing 0-cycle and n-cycle branch predictors, it further improves overall CPU performance by increasing branch prediction rate and instruction fetch throughput. Additionally, the introduction of the 1-cycle branch predictor requires no changes to the 0-cycle and n-cycle predictors.

Inclusion of the 1-cycle branch predictor can incur minimal hardware implementation cost as it can share existing branch target prediction structures and logic with the n-cycle branch predictor, so that picking and sorting the earliest m+1 branches incurs only small implementation cost. Additionally, the 1-cycle direction predictor can be quite small (e.g., 256 entries) while maintaining good performance.

The 1-cycle branch predictor can introduce predicting of a subset of branches that are earliest in a given fetch block, using relative positioning (i.e., checking the earliest m branches), instead of commonly used strict positioning, for branch direction prediction. This allows the 1-cycle direction predictor to not have to store branch position information in the prediction table, which significantly reduces the associated hardware cost.

The 1-cycle direction predictor can be trained by the n-cycle predictor, which results in quick updates that prevent repeated mispredictions. Training by the n-cycle predictor also makes the 1-cycle predictor invisible to later stages of the pipeline, which eases logic design and route placement. In contrast, n-cycle predictors have to be updated at branch resolution/retire time, and thus have a much longer branch updating latency.

Figure 7:
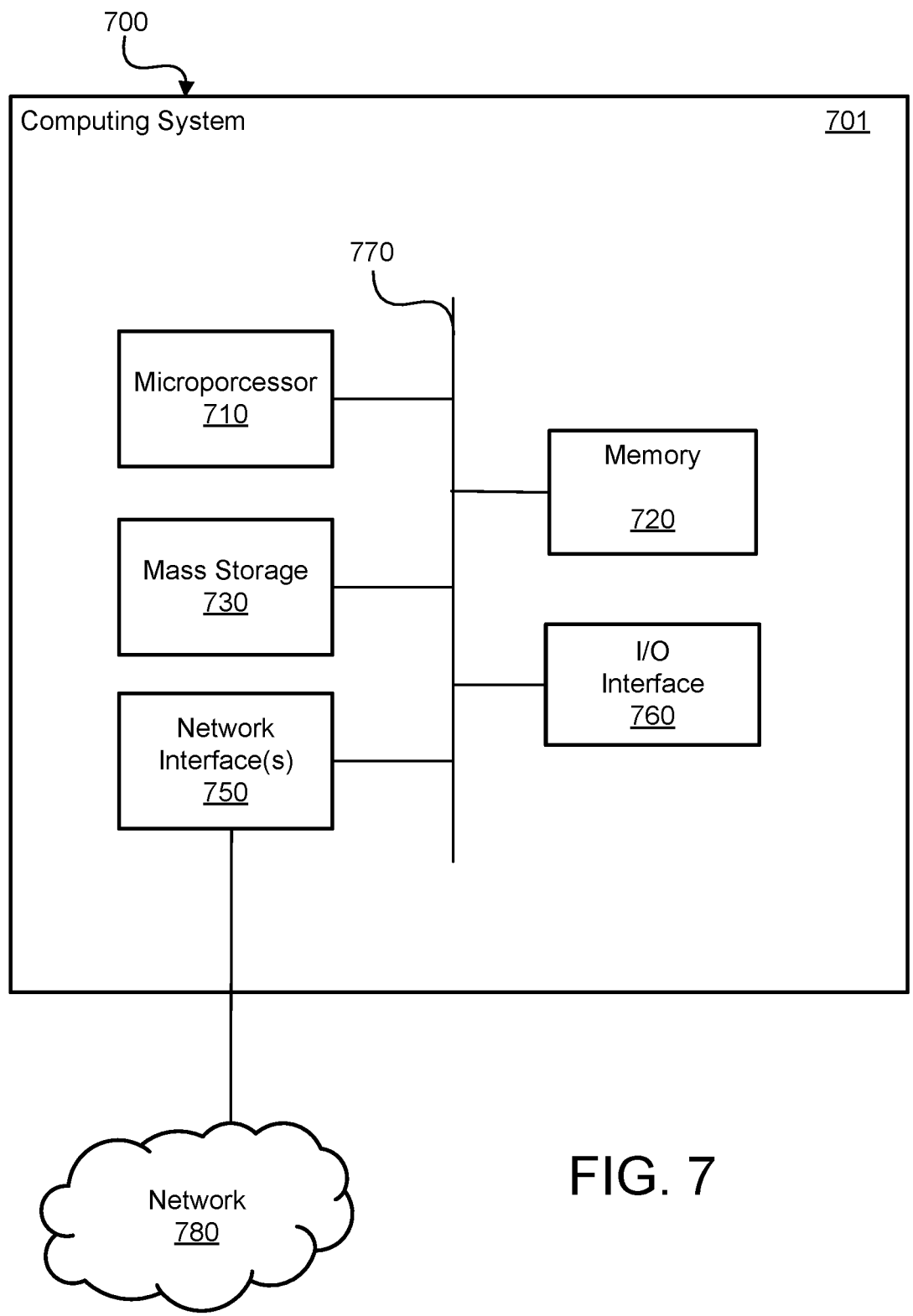
FIG. 7 is a high-level block diagram of a computing system that can be used to implement various embodiments of a microprocessor as presented in FIGS. 1A-6.

FIG. 1B represents a microprocessor 120 that can be operated in embodiments of pipelined operation such as described with respect to FIGS. 2-6. FIG. 1A is a simplified representation of a computer system using such a microprocessor. FIG. 7 consider such computing systems further.

FIG. 7 is a high-level block diagram of a computing system 700 that can be used to implement various embodiments of the microprocessors described above. In one example, computing system 700 is a network system 700. Specific devices may utilize all of the components shown, or only a subset of the components, and levels of integration may vary from device to device. Furthermore, a device may contain multiple instances of a component, such as multiple processing units, processors, memories, transmitters, receivers, etc.

The network system may comprise a computing system 701 equipped with one or more input/output devices, such as network interfaces, storage interfaces, and the like. The computing system 701 may include a central processing unit (CPU) 710, a memory 720, a mass storage device 730, and an I/O interface 760 connected to a bus 770, where the CPU can include a microprocessor such as described above with respect to FIGS. 1B and 2. The computing system 701 is configured to connect to various input and output devices (keyboards, displays, etc.) through the I/O interface 760. The bus 770 may be one or more of any type of several bus architectures including a memory bus or memory controller, a peripheral bus or the like.

The CPU 710 may comprise any type of electronic data processor, including the microprocessor 120 of FIG. 1B. The CPU 710 may be configured to implement any of the schemes described herein with respect to the pipelined operation of FIGS. 2-6, using any one or combination of steps described in the embodiments. The memory 720 may comprise any type of system memory such as static random access memory (SRAM), dynamic random access memory (DRAM), synchronous DRAM (SDRAM), read-only memory (ROM), a combination thereof, or the like. In an embodiment, the memory 720 may include ROM for use at boot-up, and DRAM for program and data storage for use while executing programs.

The mass storage device 730 may comprise any type of storage device configured to store data, programs, and other information and to make the data, programs, and other information accessible via the bus 770. The mass storage device 730 may comprise, for example, one or more of a solid-state drive, hard disk drive, a magnetic disk drive, an optical disk drive, or the like.

The computing system 701 also includes one or more network interfaces 750, which may comprise wired links, such as an Ethernet cable or the like, and/or wireless links to access nodes or one or more networks 780. The network interface 750 allows the computing system 701 to communicate with remote units via the network 780. For example, the network interface 750 may provide wireless communication via one or more transmitters/transmit antennas and one or more receivers/receive antennas. In an embodiment, the computing system 701 is coupled to a local-area network or a wide-area network for data processing and communications with remote devices, such as other processing units, the Internet, remote storage facilities, or the like. In one embodiment, the network interface 750 may be used to receive and/or transmit interest packets and/or data packets in an ICN. Herein, the term "network interface" will be understood to include a port.

The components depicted in the computing system of FIG. 7 are those typically found in computing systems suitable for use with the technology described herein, and are intended to represent a broad category of such computer components that are well known in the art. Many different bus configurations, network platforms, and operating systems can be used.

The technology described herein can be implemented using hardware, firmware, software, or a combination of these. The software used is stored on one or more of the processor readable storage devices described above to program one or more of the processors to perform the functions described herein. The processor readable storage devices can include computer readable media such as volatile and non-volatile media, removable and non-removable media. By way of example, and not limitation, computer readable media may comprise computer readable storage media and communication media. Computer readable storage media may be implemented in any method or technology for storage of information such as computer readable instructions, data structures, program modules or other data. Examples of computer readable storage media include RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by a computer. A computer readable medium or media does (do) not include propagated, modulated or transitory signals.

Communication media typically embodies computer readable instructions, data structures, program modules or other data in a propagated, modulated or transitory data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as RF and other wireless media. Combinations of any of the above are also included within the scope of computer readable media.

In alternative embodiments, some or all of the software can be replaced by dedicated hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), special purpose computers, etc. For example, some of the elements used to execute the instructions issued in FIG. 2, such as an arithmetic and logic unit (ALU), can use specific hardware elements. In one embodiment, software (stored on a storage device) implementing one or more embodiments is used to program one or more processors. The one or more processors can be in communication with one or more computer readable media/storage devices, peripherals and/or communication interfaces.

It is understood that the present subject matter may be embodied in many different forms and should not be construed as being limited to the embodiments set forth herein. Rather, these embodiments are provided so that this subject matter will be thorough and complete and will fully convey the disclosure to those skilled in the art. Indeed, the subject matter is intended to cover alternatives, modifications and equivalents of these embodiments, which are included within the scope and spirit of the subject matter as defined by the appended claims. Furthermore, in the following detailed description of the present subject matter, numerous specific details are set forth in order to provide a thorough understanding of the present subject matter. However, it will be clear to those of ordinary skill in the art that the present subject matter may be practiced without such specific details.

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

For purposes of this document, each process associated with the disclosed technology may be performed continuously and by one or more computing devices. Each step in a process may be performed by the same or different computing devices as those used in other steps, and each step need not necessarily be performed by a single computing device.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A microprocessor, comprising:
a fetch stage configured to retrieve instructions from a memory;
a buffer configured to store instructions retrieved by the fetch stage;
one or more pipelined stages configured to execute instructions stored in the buffer; and
a predictor, including:
a target predictor connected to the fetch stage and configured to predict branch/target pair for each of a plurality of instructions stored in the buffer;
a first direction predictor connected to the target predictor and configured to receive from the target predictor the plurality of branch/target pairs and to predict with a first accuracy a first branch path for each of the branch/target pairs and provide the fetch stage the predicted first branch paths with a latency of a first number of cycles; and
a second direction predictor connected to the target predictor and configured to receive from the target predictor the plurality of branch/target pairs and to predict a second branch path with a second accuracy lower than the first accuracy for each of the branch/target pairs and provide the fetch stage the predicted second branch paths with a latency of a second number of cycles, where the second number of cycles is smaller than the first number of cycles,
wherein, for each of the branch/target pairs, the fetch stage is configured to fetch both of the first branch path and the second branch path and, in response to the second branch path being incorrect, determine whether the first branch path is correct.

2. The microprocessor of claim 1, wherein the predictor further includes a branch predictor configured to predict branch paths of instructions stored in the buffer for a sub-set of instructions and having a latency of zero cycles.

3. The microprocessor of claim 1, wherein the target predictor is configured to predict branch/target pairs in one cycle.

4. The microprocessor of claim 3, wherein the target predictor comprises branch target buffers.

5. The microprocessor of claim 3, wherein the second number of cycles is one.

6. The microprocessor of claim 1, wherein the number of second branch paths predicted by the second direction predictor in a single pipeline cycle is less than then the maximum number of instructions retrieved by the fetch stage in the single pipeline cycle, and the second direction predictor is configured to predict a subset of the instructions fetched in the single pipeline cycle having the earliest addresses.

7. The microprocessor of claim 1, wherein the number of second branch paths predicted by the second direction predictor in a single pipeline cycle is M, where M is the maximum number of instructions retrieved by the fetch stage in the single pipeline cycle.

8. The microprocessor of claim 1, wherein the first direction predictor is connected to receive from the one or more pipelined stages indications of whether the predicted first branch paths were correctly predicted, and the first predictor is connected to the second predictor, the second predictor being configured to be trained by the first predictor based on the indications of whether the second paths were correctly predicted.

9. The microprocessor of claim 1, wherein second predictor is configured to have a smaller amount of memory than the first predictor.

10. The microprocessor of claim 1, wherein for a set of instructions retrieved by the fetch stage in a single pipeline cycle, the second predictor determines the second branch paths beginning with the branch/target pair with the earliest address.

11. The microprocessor of claim 1, wherein the first direction predictor and the second direction predictor are connected to receive from the one or more pipelined stages indications of whether the predicted first and second branch paths were correctly predicted and are configured to update the first and second branch path predictions based on the indications.

12. The microprocessor of claim 1, wherein the first direction predictor is connected to receive from the one or more pipelined stages indications of whether the predicted first branch paths were correctly predicted, configured to update the first branch path predictions based on the indications, and connected to the second direction predictor to update the second branch path predictions.

13. A microprocessor, comprising:
a pipelined computing structure, including:
a fetch stage configured to fetch instructions from a memory;
a buffer configured to store instructions fetched by the fetch stage; and
one or more subsequent stages configured to execute instructions stored in the buffer; and
a hierarchical branch predictor configured to predict branch paths taken for instructions stored in the buffer and provide the fetch stage the predicted branch paths, the hierarchical branch predictor including:
a zero-cycle branch predictor configured to predict branch paths of instructions stored in the buffer for a sub-set of instructions with a latency of zero pipeline cycles;
a first branch predictor configured to predict branch paths of instructions stored in the buffer with a latency of a plurality of pipeline cycles;
a second branch predictor configured to predict branch paths of instructions stored in the buffer having a branch prediction accuracy intermediate to the zero-cycle branch predictor and the first branch predictor with a non-zero latency of a lower number of pipeline cycles than the first branch predictor; and
a target predictor connected to the buffer and configured to predict branch/target pairs for instructions stored in the buffer, wherein the first branch predictor includes a first direction predictor connected to the target predictor and configured to receive from the target predictor the plurality of branch/target pairs and to predict a corresponding branch taken for each of the branch/target pairs, the second branch predictor includes a second direction predictor connected to the target predictor and configured to receive from the target predictor the plurality of branch/target pairs and to predict a corresponding branch taken for each of the branch/target pairs, and, for each of the branch/target pairs, the fetch stage is configured to fetch both of the first branch path and the second branch path and, in response to the second branch path being incorrect, determine whether the first branch path is correct.

14. The microprocessor of claim 13, wherein a number of branch paths predicted by the second branch predictor in a single pipeline cycle is M, where M is less than then the maximum number of instructions retrieved by the fetch stage in the single pipeline cycle, and the second direction predictor predicts a subset of the instructions fetched in the single pipeline cycle corresponding to M branches having the earliest addresses.

15. The microprocessor of claim 13, wherein the second branch predictor is configured to predict branch paths with a latency of one pipeline cycle.

16. A method of operating a pipelined computing structure, comprising:
   predicting, by a target predictor, branch/target pairs for a first set of instructions fetched for execution in the pipelined computing structure;
   receiving a first of the predicted branch/target pairs by a first direction predictor and a second direction predictor;
   performing, by the first direction predictor, a first prediction of a first accuracy and a first latency for a first branch to be selected for the first predicted branch/target pair when executing the first set of instructions, wherein the performing the first prediction generates a first branch path;
   performing, by the second direction predictor, a second prediction of a second accuracy lower than the first accuracy and a second latency lower than the first latency for a second branch to be selected for the first predicted branch/target pair when executing the first set of instructions, wherein the performing the second prediction generates a second branch path;
   fetching both the first branch path and the second branch path;
   determining whether the second prediction for the first predicted branch/target pair is correct;
   in response to the second prediction for the first predicted branch/target pair being correct, fetching one or more additional instructions corresponding to the predicted second branch for execution; and
   in response to the second prediction for the first predicted branch/target pair being incorrect, determining whether the first prediction for the first predicted branch/target pair is correct.

17. The method of claim 16, further comprising:
   performing an additional prediction for a subset of the first set of instructions fetched for execution in the pipelined computing structure, the additional prediction having a lower accuracy than the second accuracy and a latency of zero cycles; and
   fetching one or more additional instructions corresponding to the additional prediction in response to the corresponding additional prediction being correct.

18. The method of claim 16, further comprising:
   executing the first set of instructions;
   subsequently receiving indications of whether the first branches and second branches were correctly predicted; and
   updating the first and second predictions based on the indications.

19. The method of claim 16, further comprising:
   executing the first set of instructions;
   subsequently receiving indications of whether the first branches were correctly predicted; and
   updating the first and second predictions based on the indications.

* * * * *

UNITED STATES PATENT AND TRADEMARK OFFICE
CERTIFICATE OF CORRECTION

PATENT NO. : 10,929,136 B2
APPLICATION NO. : 15/950434
DATED : February 23, 2021
INVENTOR(S) : Hu et al.

Page 1 of 1

It is certified that error appears in the above-identified patent and that said Letters Patent is hereby corrected as shown below:

In the Claims

Column 15, Line 53 (Claim 6, Line 3): After "than" and before "the" delete "then".

Column 16, Line 4, (Claim 9, Line 1): After "wherein" and before "second" insert -- the --.

Column 17, Line 6, (Claim 14, Line 3): After "than" and before "the" delete "then".

Signed and Sealed this
Fourteenth Day of September, 2021

Drew Hirshfeld
*Performing the Functions and Duties of the*
*Under Secretary of Commerce for Intellectual Property and*
*Director of the United States Patent and Trademark Office*